United States Patent
Ahn et al.

(10) Patent No.: US 8,499,591 B2
(45) Date of Patent: Aug. 6, 2013

(54) DRUM TYPE LAUNDRY MACHINE

(75) Inventors: In Geun Ahn, Changwon-si (KR);
Hyeok Deok Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 831 days.

(21) Appl. No.: 12/374,566

(22) PCT Filed: Jul. 19, 2007

(86) PCT No.: PCT/KR2007/003491
§ 371 (c)(1),
(2), (4) Date: Jan. 21, 2009

(87) PCT Pub. No.: WO2008/010674
PCT Pub. Date: Jan. 24, 2008

(65) Prior Publication Data
US 2009/0211312 A1     Aug. 27, 2009

(30) Foreign Application Priority Data

Jul. 20, 2006 (KR) .................. 10-2006-0068113
Jul. 21, 2006 (KR) .................. 10-2006-0068499

(51) Int. Cl.
*D06F 37/30* (2006.01)
(52) U.S. Cl.
USPC .......................................................... 68/140
(58) Field of Classification Search
USPC ........................................... 68/139–142, 24
See application file for complete search history.

(56) References Cited

U.S. PATENT DOCUMENTS

| | | | | |
|---|---|---|---|---|
| 6,460,382 | B1 * | 10/2002 | Kim et al. | 68/140 |
| 6,914,363 | B2 * | 7/2005 | Kim et al. | 310/261.1 |
| 2002/0194884 | A1 | 12/2002 | Heyder et al. | |
| 2004/0163428 | A1 * | 8/2004 | Kim et al. | 68/140 |
| 2005/0028566 | A1 * | 2/2005 | Kim et al. | 68/140 |
| 2005/0028567 | A1 * | 2/2005 | Kim et al. | 68/140 |
| 2005/0057108 | A1 * | 3/2005 | Kim et al. | 310/67 R |
| 2005/0097928 | A1 * | 5/2005 | Choi | 68/140 |
| 2005/0144990 | A1 * | 7/2005 | Kim et al. | 68/140 |
| 2005/0146235 | A1 * | 7/2005 | Kim et al. | 310/67 R |
| 2006/0016228 | A1 * | 1/2006 | Chang et al. | 68/23.1 |
| 2006/0101866 | A1 * | 5/2006 | Kim et al. | 68/3 R |
| 2006/0101872 | A1 * | 5/2006 | Kim et al. | 68/139 |

FOREIGN PATENT DOCUMENTS

EP          1 602 769        12/2005

OTHER PUBLICATIONS

Machine translation of KR 10-2005-0073219, Jul. 13, 2005.*
International Search Report dated Mar. 17, 2008.

* cited by examiner

*Primary Examiner* — Joseph L Perrin
(74) *Attorney, Agent, or Firm* — KED & Associates, LLP

(57) ABSTRACT

A drum washing machine includes a tub installed in a housing to receive wash water therein, a drum rotatably installed in the tub, a rotor having a rotating shaft connected to the drum, a bearing housing having at least one bearing for supporting the rotating shaft of the rotor, the bearing housing being located at the tub, and a stator spaced apart from the rotor by a predetermined distance and directly connected to the tub.

11 Claims, 11 Drawing Sheets

DRUM TYPE LAUNDRY MACHINE

TECHNICAL FIELD

The present invention relates to a drum washing machine, and more particularly, to a direct-connection type drive device of a drum washing machine.

BACKGROUND ART

Considering a general washing method using a drum type washing machine, in a state wherein laundry, wash water and detergent(s) are put into a drum of the washing machine, the drum is rotated by a drive force of a motor, causing the laundry to be washed using a frictional force between the laundry and the rotating drum. The drum washing method has less damage to laundry and prevents entangling of laundry while achieving laundry pounding and rubbing washing effects.

Conventional drum washing machines are classified on the basis of a driving method thereof, into an indirect-connection type in which a drive force of a motor is indirectly transmitted to a drum via belts wound on a motor pulley and a drum pulley, and a direct-connection type in which a rotor of a brushless DC (BLDC) motor is directly connected to a drum to directly transmit a drive force of the motor to the drum.

Here, the former indirect-connection type drum washing machine, in which the drive force of the motor is indirectly transmitted via the belts wound on the motor pulley and the drum pulley rather than being directly transmitted to the drum, inevitably suffers from the loss of energy and causes excessive noises.

To solve the problems of the conventional indirect connection type drum washing machine, recently, the use of a direct-connection type drum washing machine using a BLDC motor is expanding.

Now, the configuration of a conventional direct-connection type drum washing machine will be described in brief with reference to FIG. 1.

FIG. 1 is a longitudinal sectional view illustrating the configuration of a conventional drum washing machine. The conventional drum washing machine comprises a tub 2 installed in a cabinet 1, and a drum 3 rotatably installed in the center of the tub 2.

A motor is mounted to a rear wall of the tub 2. The motor includes a stator 6 fixed to an outer surface of the rear wall of the tub 2, and a rotor 5 configured to surround the stator 6, the rotor 5 being penetrated through the tub 2 to be axially connected to the drum 3.

Although not shown, a metallic tub supporter is interposed between the rear wall of the tub 2 and the stator 6. The tub supporter has approximately the same shape as the outer contour of the rear wall of the tub 2. The tub supporter is fixed to the rear wall of the tub 2 in the course of coupling the stator 6 to the rear wall of the tub 2, and serves not only to support the load of the stator 6, but also to maintain the concentricity of the stator 6. The tub supporter is generally fabricated by pressing a steel plate and configured to cover the majority of the rear wall of the tub 2.

A door 21 is installed at a front side of the cabinet 1, and a gasket 22 is installed between the door 21 and the tub 2.

A hanging spring 23 is installed between an inner ceiling surface of the cabinet 1 and an outer top surface of the tub 2, to support the tub 2. Also, a friction damper 24 is installed between an inner bottom surface of the cabinet 1 and an outer lower surface of the tub 2, to alleviate vibrations of the tub 2 caused during a dehydrating operation.

FIG. 2 is a perspective view illustrating the outer appearance of the stator shown in FIG. 1, and FIG. 3 is a perspective view illustrating a dividable core DC included in the stator of FIG. 2. The conventional stator core consists of a plurality of unit cores each being fabricated by pressing a metal plate. The unit core includes a base 150, teeth 151 protruding from one side of the base 150, and a protrusion 500 protruding from the other side of the base 150 opposite to the teeth 151, the protrusion 500 having a coupling bore 500a. The plurality of unit cores are stacked one above another to form a unit core assembly, and then, a plurality of unit core assemblies are circumferentially connected with one another, to complete a so-called dividable stator core.

Here, the coupling bore 500a of the protrusion 500 is required to couple the stator 6 to the rear wall of the tub 2 by means of a bolt, and the protrusion 500 serves to support a fastening load of the bolt penetrated through the coupling bore 500a.

However, the conventional stator 6 using the above described dividable core DC suffers from a complicated fabrication process as well as a great loss of materials. Further, the weight of the stator increases as much as the protrusion 500.

To fix the conventional stator 6 to the rear wall of the tub 2, the metallic tub supporter should have been essentially provided between the stator 6 and the rear wall of the tub 2. That is, in order to increase the coupling strength of the heavy stator and the rear wall of the tub, the tub supporter having approximately the same shape as that of the rear wall of the tub should have been essentially provided.

Further, there is a great difficulty in the fabrication of the tub supporter having approximately the same shape as that of the rear wall of the tub, and coupling of the tub supporter with respect to the rear wall of the tub tends to increase the number of fabrication processes. This is because the tub supporter, which is made of a steel plate to cover the majority of the rear wall of the tub, is very heavy. However, it is very difficult to couple the heavy tub supporter to the rear wall of the tub for the purpose of maintaining the concentricity of the stator.

For this reason, the above described conventional direct-connection type drum washing machine has a need for reducing the weight of the stator 6 while assuring the stator 6 to be more easily and firmly coupled to the tub 2.

DISCLOSURE OF INVENTION

Technical Problem

An object of the present invention devised to solve the problem lies on a drum washing machine using an outer rotor type motor in which a stator of the motor can be fabricated in a simplified manner with a small quantity of material to have a low weight and also can be stably mounted to a tub of the washing machine.

Another object of the present invention devised to solve the problem lies on a drum washing machine in which a stator can be assembled by an easy and simplified process and achieve a sufficient supporting force with respect to a rear wall of a tub.

A further object of the present invention devised to solve the problem lies on a drum washing machine in which the concentricity of a stator can be easily set in the course of coupling the stator and be maintained continuously.

Technical Solution

The object of the present invention can be achieved by providing a drum washing machine comprising: a tub installed in a housing to receive wash water therein; a drum rotatably installed in the tub; a rotor having a rotating shaft connected to the drum; a bearing housing having at least one bearing for supporting the rotating shaft of the rotor, the bearing housing being located at the tub; and a stator spaced apart from the rotor by a predetermined distance and directly connected to the tub.

Preferably, the bearing housing is insert-molded in the tub to be integrally formed with the tub. The tub may comprise a hub portion protruding from the center of a rear outer surface thereof. In this case, the bearing housing may be located to be penetrated through the hub portion of the tub. Preferably, an outer peripheral surface of the bearing housing and an inner peripheral surface of the hub portion are formed along their circumferential or longitudinal direction, with indentations to be engaged with each other.

The hub portion of the tub may be integrally formed with the bearing housing. Preferably, the bearing housing comprises: a cylindrical body; and a hub portion integrally formed with the body.

Preferably, the hub portion of the bearing housing has a radius larger than a radius of the body.

The hub portion of the bearing housing may comprise a stator seating portion. The stator comprises a plurality of coupling portions protruding in a radial inward direction thereof, the coupling portions being seated on the seating portion of the bearing housing. At least two of the coupling portions may have coupling bores, and the seating portion may have coupling holes corresponding to the coupling bores.

The seating portion may comprise a dented region. The hub portion of the bearing housing may further comprise an inserting portion to be inserted between the coupling portions of the stator. Preferably, an outer peripheral surface of the inserting portion has a shape corresponding to a shape of an inner peripheral surface of the stator.

The hub portion of the bearing housing may have a radius smaller than a radius of the body. In this case, the body of the bearing housing around the hub portion may comprise a stator seating portion. Preferably, an outer peripheral surface of the hub portion has a shape corresponding to a shape of an inner peripheral surface of the stator.

Preferably, the stator comprises a plurality of coupling portions protruding in a radial inward direction thereof, the coupling portions being seated on the seating portion of the bearing housing. At least one of the coupling portions may have a coupling bore, and the seating portion may have a coupling hole corresponding to the coupling bore. Here, the seating portion may comprise a dented region.

The tub may comprise a stator seating portion in a radial outward position of the hub portion.

In this case, preferably, the stator comprises a plurality of coupling portions protruding in a radial inward direction thereof, the coupling portions being seated on the seating portion of the tub. Preferably, an outer peripheral surface of the hub portion of the tub has a shape corresponding to a shape of an inner peripheral surface of the stator.

The hub portion of the tub may protrude from the tub to be integrally formed with the bearing housing. Preferably, the bearing housing comprises a radially protruding flange. Here, the flange may comprise: a plurality of extensions radially extending from the bearing housing; and at least one hole formed in at least one of the extensions.

Preferably, the coupling portions of the stator are disposed between the respective neighboring extensions and coupled with the tub.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. Meanwhile, wherever possible, the same reference numbers will be used throughout the drawings to refer to the same or like parts of the prior art.

Figure 1:
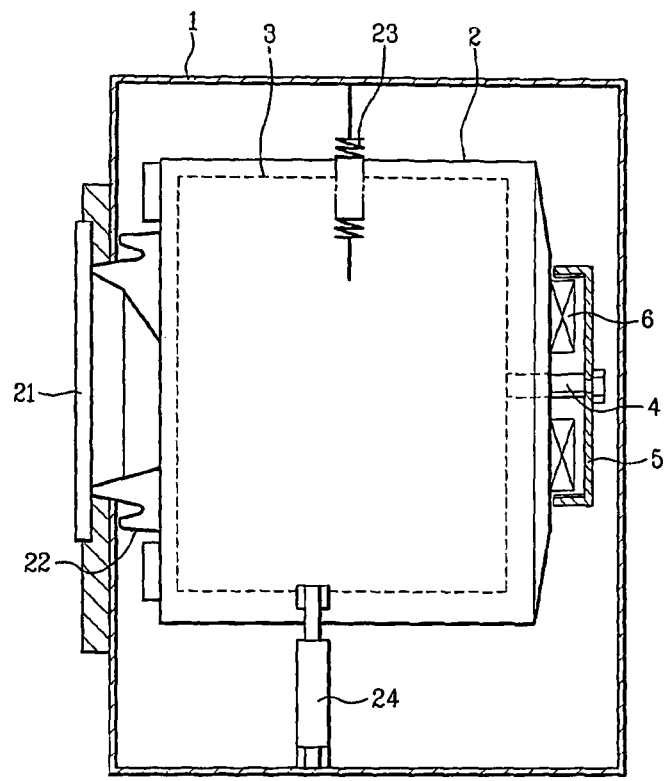
FIG. 1 is a longitudinal sectional view schematically illustrating the configuration of a conventional direct-connection type drum washing machine.
Figure 2:
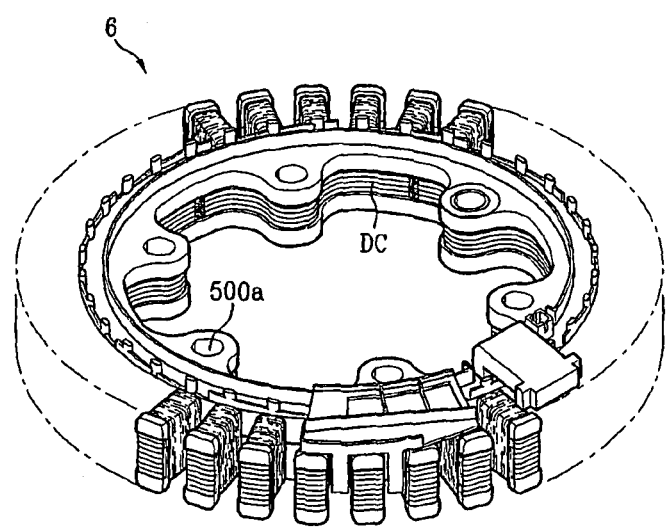
FIG. 2 is a perspective view illustrating the configuration of a conventional stator.
Figure 3:
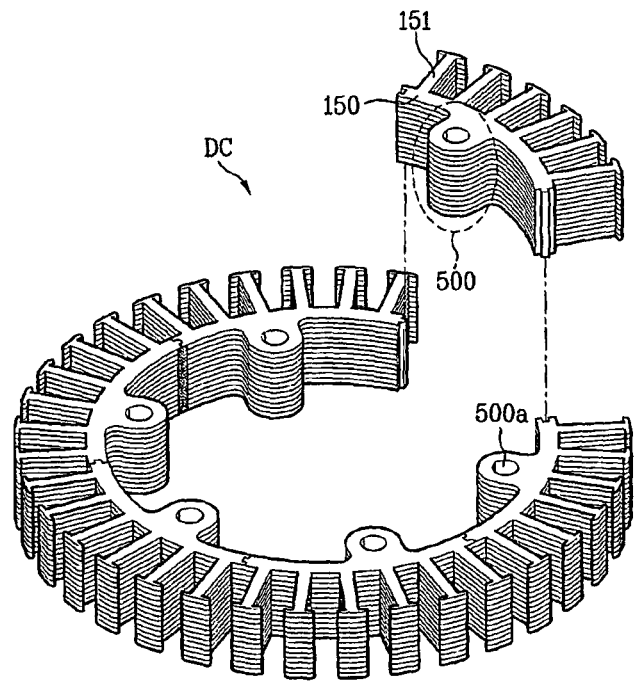
FIG. 3 is a perspective view illustrating a dividable core of FIG. 2.
Figure 4:
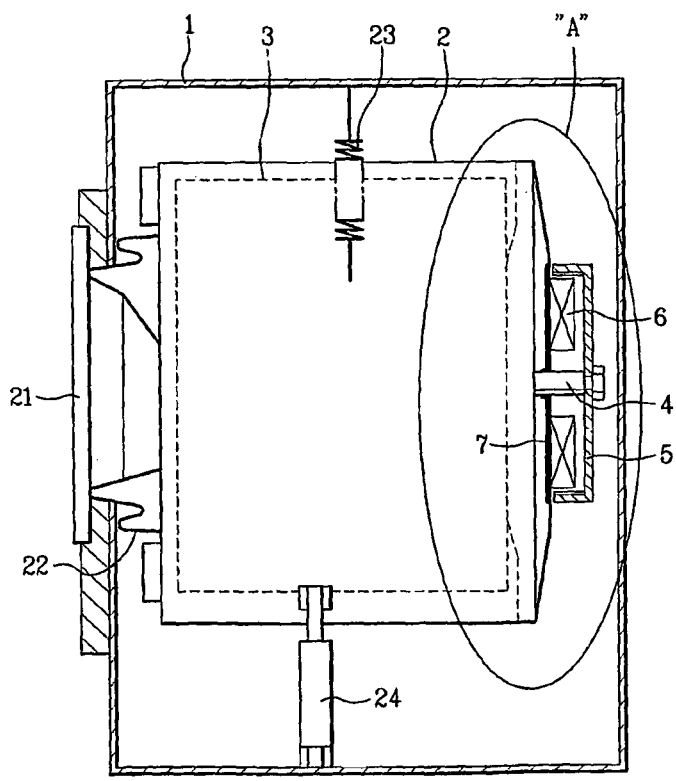
FIG. 4 is a longitudinal sectional view schematically illustrating the configuration of a direct-connection type drum washing machine according to the present invention.
Figure 5:
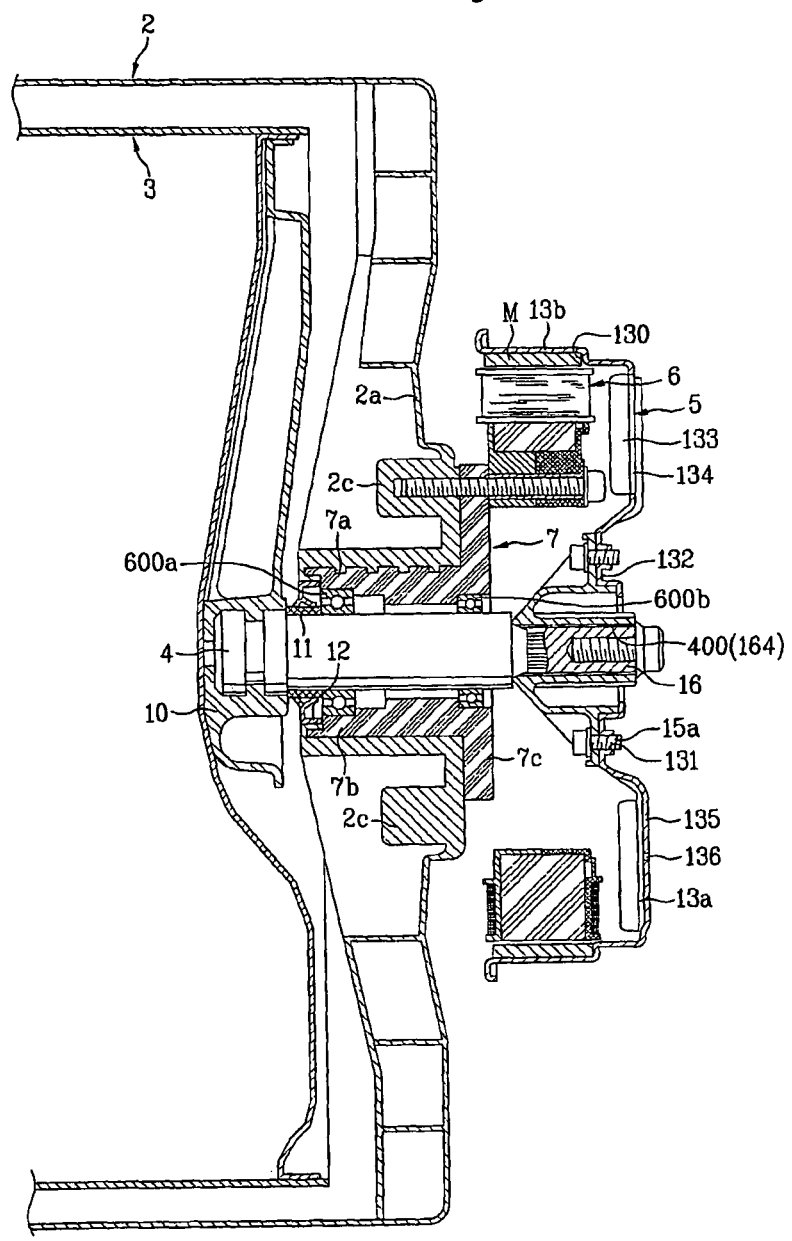
FIG. 5 is an enlarged view of the portion "A" of FIG. 4, illustrating a first embodiment of the coupling structure of a drive device included in the drum washing machine according to the present invention.

FIG. 4 is a longitudinal sectional view schematically illustrating the configuration of a direct-connection type drum washing machine according to the present invention, and FIG. 5 is an enlarged view of the portion "A" of FIG. 4, illustrating the longitudinal cross section of a drive device included in the drum washing machine according to the present invention.

The drum washing machine according to the present invention comprises a motor having a stator 6 and a rotor 5, a tub 2 installed in a cabinet 1 to receive wash water therein and having a base 2a to be coupled with the stator 6, and a bearing housing 7 to receive bearings supporting a rotating shaft of the rotor 5.

The drum washing machine of the present invention further comprises a drum 3 installed in the tub 2 in a selectively rotatable manner to receive laundry therein, and a shaft 4 axially connected to the rotor 5 to transmit a drive force of the motor to the drum 3.

Preferably, the tub 2 is made of plastic and the bearing housing 7 is made of metal. The bearing housing 7 is preferably provided at a rear wall of the tub 2, and more particularly, at the center of the base 2a of the tub 2, to support bearings installed around both ends of the shaft 4.

More specifically, the bearing housing 7 is made of aluminum alloy, etc., and is insert-molded in the tub 2 during an injection molding of the plastic tub 2, so as to be integrally formed with the tub base 2a. Of course, it will be appreciated that the bearing housing 7 may be coupled to the tub base 2a by use of bolts, etc.

Referring to FIG. 5, the bearing housing 7 includes a sleeve-shaped cylindrical body for supporting bearings 600a and 600b. The bearings 600a and 600b are received in the bearing housing 7 to rotatably support the shaft 4.

The bearing housing 7 is insert-molded in the tub 2 such that it is penetrated through the center of the tub base 2a to be integrally formed with the tub 2.

Preferably, the bearing housing 7 has indentations 7a formed in an outer peripheral surface thereof. With the indentations 7a, the bearing housing 7 can achieve a high coupling strength with respect to the tub base 2a. The indentations 7a may be formed in a circumferential direction or a longitudinal direction of the outer peripheral surface of the bearing housing 7. Of course, it will be appreciated that the indentations 7a may be formed in both the circumferential and longitudinal directions of the outer peripheral surface of the bearing housing 7.

When the indentations 7a are formed in the longitudinal direction of the bearing housing 7, the bearing housing 7 can achieve a high coupling strength with respect to a longitudinal direction of the tub base 2a. Also, when the indentations 7a are formed in the circumferential direction of the bearing housing 7, the bearing housing 7 can achieve a high coupling strength with respect to a circumferential direction of the tub base 2a.

The shaft 4 is penetrated through the center of the bearing housing 7 such that one end of the shaft 4 is connected to the drum 3 and the other end is connected to the rotor 5.

Specifically, a front end of the shaft 4 is connected to the drawn 3 via a spider 10 to transmit a rotating force thereof to the drum 3 with a high reliability. A brass bushing 11 as an anti-rust member is press-fitted around a partial region of the shaft 4 from just behind the spider 10 to the front bearing 600a. In turn, a sealing member 12 is installed on an outer surface of the bushing 11 to prevent invasion of moisture into the bearing.

The rotor 5, which constitutes a direct-connection type motor, is coupled to the center of a rear end of the shaft 4. The stator 6, which constitutes the direct-connection type motor together with the rotor 5, is located inside the rotor 5 and fixedly coupled to the rear wall of the tub 2.

The rotor 5 is made of an iron plate. As shown in FIG. 5, the rotor 5 has a rear wall 13a centrally formed with a hub 132 having through-holes 131, through which fastening members 15a such as bolts can be penetrated to couple the rotor 5 to the shaft 4. The rotor 5 also has a lateral wall 13b extending forward from the edge of the rear wall 13a, the lateral wall 13b being circumferentially formed with a stepped portion having a seating surface 130 to support a magnet M attached to a front position of an inner surface of the lateral wall 13a.

Preferably, the overall shape of the rotor 5 is defined by a press process.

The rotor 5 is also formed with a plurality of cooling fins 133 radially arranged around the hub 132 and each having a predetermined radial length. The cooling fins 133 serve to blow air toward the stator 6 during rotation of the rotor 5, so as to remove heat generated from the stator 6.

The cooling fins 133 are fabricated by a lancing process such that they are bent, by an angle of 90 degrees, relative to the rear wall 13a of the rotor 5, to face an opening of the rotor 5. With the lancing process, the cooling fins 133 define a vent hole 134.

The rotor 5 also has embossing portions 135 formed on the rear wall 13a thereof at positions between the respective neighboring cooling fins 133, to reinforce the strength of the rotor 5. Each of the embossing portions 135 has a drain hole 136 for the discharge of moisture.

Meanwhile, a connector 16 is provided at the edge of a through-hole perforated in the hub 132 of the rotor 5. The connector 16 is serration-coupled onto an outer peripheral surface of the rear end of the shaft 4 that is exposed behind the rear bearing 600b.

The connector 16 is made of resin having a different vibration mode from that of the rotor 5 that is made of an iron plate, and serves as a bushing for the rotor 5. In addition, the connector 16 serves as an insulator between the stator 6 or the rotor 5 and the shaft 4.

The connector 16 has serrations 164 provided at on an inner peripheral surface thereof to be engaged with serrations 400 provided around the rear end of the shaft 4.

Meanwhile, the base 2a of the tub 2 is provided with a hub portion 7c, into which the bearing housing 7 will be insert-molded upon the injection molding of the tub 2.

Preferably, the hub portion 7c of the tub base 2a is protruded by a predetermined length as compared to the remaining portion of the tub base 2a. This is because it is necessary to assure a sufficient supporting length of the shaft 4 for rotatably supporting the shaft 4 with respect to the tub 2. Since there is a limit to increase the thickness of the overall rear wall of the tub 2 for assuring the sufficient supporting length of the shaft 4, it is preferable to increase the thickness of only a shaft penetration region of the tub rear wall.

Of course, it will be appreciated that the hub portion 7c may be constructed only by a portion of the bearing housing 7 protruding from an outer surface of the tub base 2a.

In the present invention, the stator 6 is directly connected to the bearing housing 7. Hereinafter, preferred embodiments of the structure of a drive device included in the drum washing machine according to the present invention, and more particularly, the coupling structure of the stator and the bearing housing will be described in detail with reference to FIGS. 5 to 11.

First, the coupling structure of the stator according to a first embodiment of the present invention will be described in detail with reference to FIGS. 5 and 6.

In the present embodiment, the bearing housing 7 includes a body 7b having a substantially sleeve shape, i.e. a cylindrical shape, and the hub portion 7c formed at a side of the body 7b and coupled with the stator 6. The stator 6 is directly connected to the bearing housing hub portion 7c.

The bearing housing hub portion 7c is exposed from the outer surface of the tub base 2a after the bearing housing 7 is integrally formed with the tub 2 by insert-molding. As shown, the bearing housing hub portion 7c may have a radius larger than that of the bearing housing body 7b.

The bearing housing hub portion 7c has a seating portion 7d on which the stator 6 will be seated. The seating portion 7d has a flat plane shape to allow the stator 6 to be seated thereon at a position perpendicular to the shaft 4.

Although the stator 6 of the present invention will be described hereinafter, the stator 6 has a plurality of coupling portions 143 arranged in a circumferential direction thereof to protrude in a radial inward direction. All or some of the coupling portions 143 are formed with coupling bores 143b such that the bearing housing 7, and more particularly, the bearing housing hub portion 7c is coupled with the stator 6 through the coupling bores 143b.

Preferably, the stator 6, and more particularly, the coupling portions 143 of the stator 6 are seated on the seating portion 7d. For this, the seating portion 7d is preferably formed with coupling holes 7e corresponding to the respective coupling bores 143b formed in the coupling portions 143 of the stator 6.

In addition, the seating portion 7d is preferably formed with positioning recesses 7f to determine a radial position of the stator 6. The positioning recesses 7f will be engaged with positioning bosses (143a, See FIG. 13) of the stator 6. Accordingly, with the positioning recesses 7f and the positioning bosses 143a, the radial position of the stator 6, i.e. the concentricity of the stator 6 can be correctly set in the course of coupling the stator 6 with the bearing housing 7. This also has the effect of minimizing a deviation in the concentricity of the stator 6 during operation of the motor.

Once the concentricity of the stator 6 is correctly set, the coupling portions 143 of the stator 6 are seated on the seating portion 7d. Then, as bolts b are fastened through the coupling bores 143b and the coupling holes 7e, the stator 6 is directly connected with the bearing housing 7.

Figure 6:
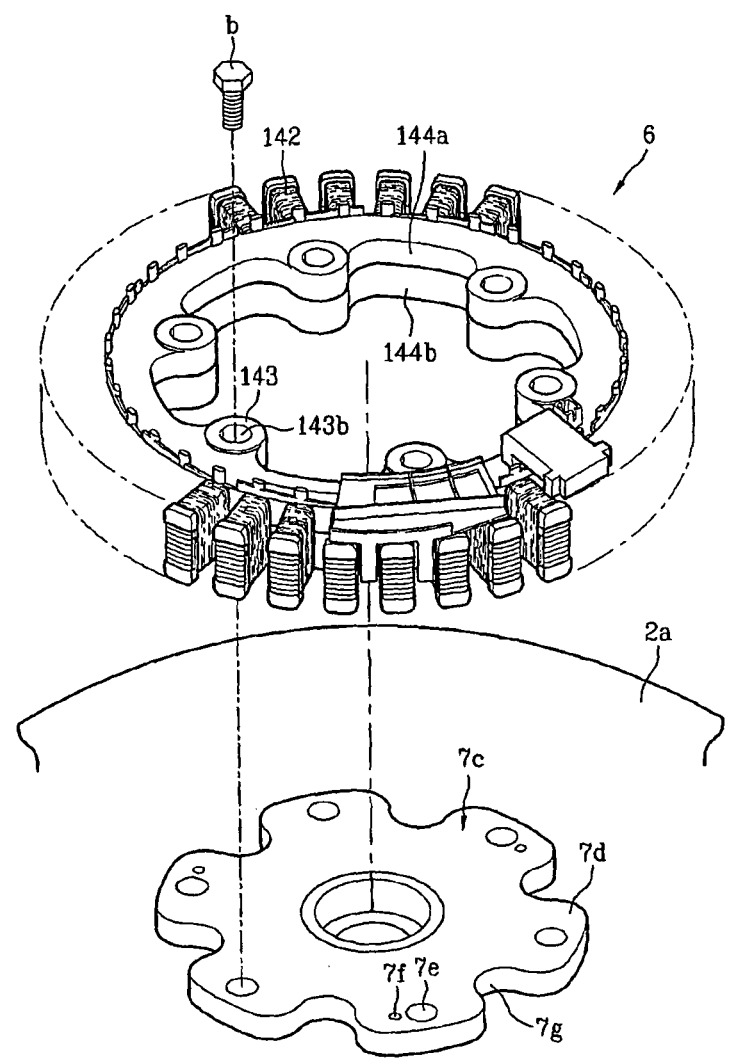
FIG. 6 is a perspective view of FIG. 5.

As shown in FIG. 6, preferably, the remaining region of the seating portion 7d except for the coupling holes 7e and the positioning recesses 7f are dented in a radial inward direction, to form a dented region 7g. The dented region 7g has the effect of reducing the material of the bearing housing 7 and consequently, the weight of the bearing housing 7.

Figure 7:
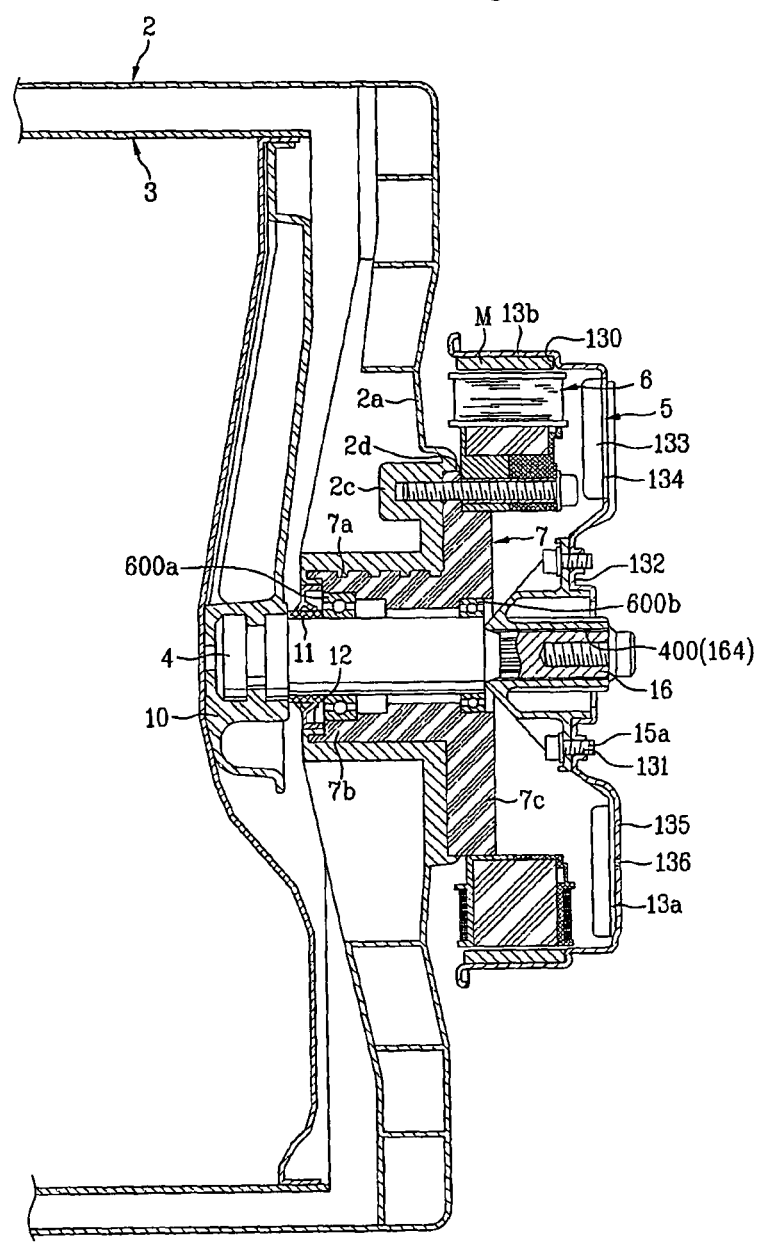
FIG. 7 is an enlarged view of the portion "A" of FIG. 4, illustrating a second embodiment of the coupling structure of the drive device included in the drum washing machine according to the present invention.
Figure 8:
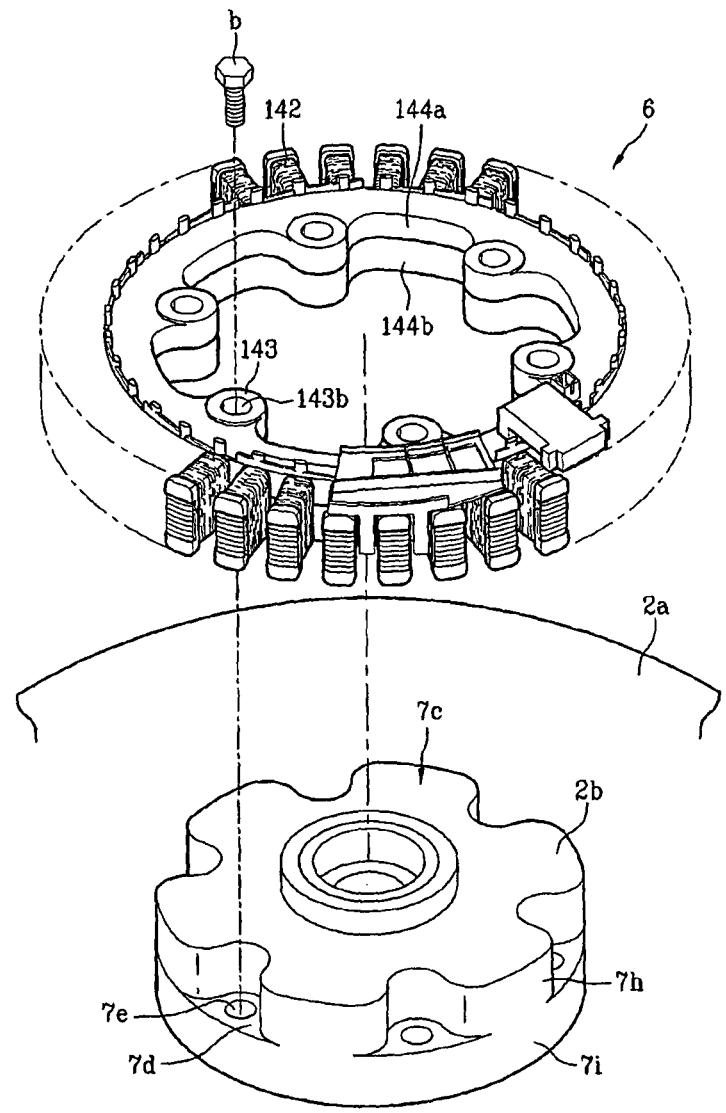
FIG. 8 is a perspective view of FIG. 7.

Hereinafter, another coupling structure of the stator according to a second embodiment of the present invention will be described in detail with reference to FIGS. 7 and 8. A difference between the present embodiment and the previously described first embodiment is that the bearing housing hub portion 7c has a shape suitable to determine a radial position of the stator 6 in itself.

Specifically, in the present embodiment, the bearing housing hub portion 7c consists of an upper inserting portion 7h and a lower coupling portion 7i. Preferably, the bearing housing hub portion 7c has a radius larger than that of the bearing housing body 7b.

The coupling portion 7i has the stator seating portion 7d on an upper surface thereof. Preferably, the coupling portions 143 of the stator 6 are seated on the seating portion 7d. The seating portion 7d has the coupling holes 7e to correspond to the coupling bores 143b formed in the coupling portions 143 of the stator 6.

The outer peripheral surface of the inserting portion 7h has a shape corresponding to that of the inner peripheral surface of the stator 6. For example, if the outer peripheral surface of the inserting portion 7h has indentations arranged in a circumferential direction thereof, the inner peripheral surface of the stator 6 may have indentations arranged in a circumferential direction thereof. That is, the inner peripheral surface of the stator 6 is engaged with the outer peripheral surface of the inserting portion 7h.

As the shape of the outer peripheral surface of the inserting portion 7h matches with the shape of the inner peripheral surface of the stator 6, a radial position of the stator 6 can be determined. Therefore, while the stator 6 is coupled with the bearing housing 7 or during operation of the motor, it is possible to minimize a deviation in the concentricity of the stator 6.

In addition, the inserting portion 7h can distribute and support the load of the stator 6, and also support a rotation repulsive force of the stator 6 caused by rotation of the rotor 5. This assures the stator 6 to be more firmly and stably coupled with the bearing housing 7. Of course, in this case, the stator 6 is located at the base 2a of the tub 2.

Figure 9:
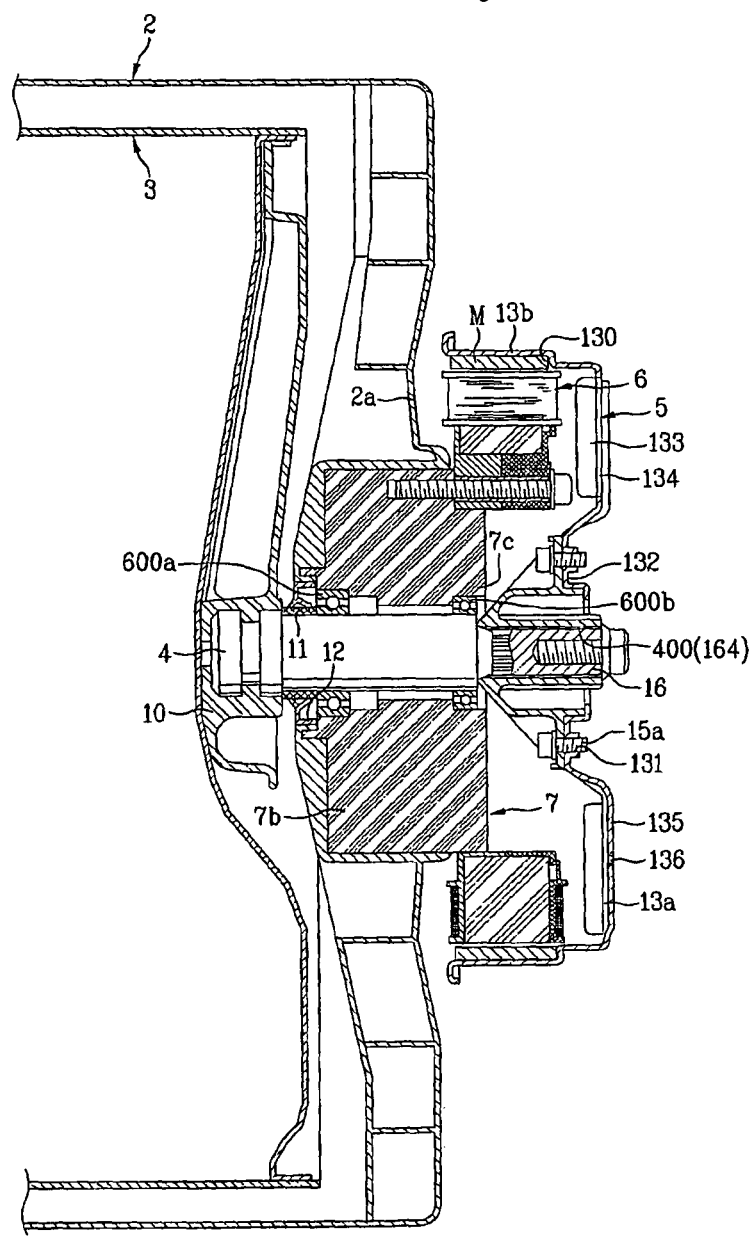
FIG. 9 is an enlarged view of the portion "A" of FIG. 4, illustrating a third embodiment of the coupling structure of the drive device included in the drum washing machine according to the present invention.

Hereinafter, a further coupling structure of the stator according to a third embodiment of the present invention will be described with reference to FIG. 9. Although most configurations of the present embodiment are identical to those of the above described embodiments, in the present embodiment, the radius of the bearing housing body 7b is larger than the radius of the bearing housing hub portion 7i; and the stator 6 is directly connected to the bearing housing body 7b.

In the present embodiment, the stator 6 is inserted into the bearing housing hub portion 7c, and coupled with the bearing housing 7 via the coupling bores 143b formed in the coupling portions 143 of the stator 6 and coupling holes 7e formed in the bearing housing body 7b.

Similar to the above described embodiments, the shape of the outer peripheral surface of the bearing housing hub portion 7c matches with the shape of the inner peripheral surface of the stator 6, such that the bearing housing hub portion 7c can support the rotation repulsive force as well as the load of the stator 6 while maintaining the concentricity of the stator 6.

The bearing housing body 7b has a substantially cylindrical shape, and may be radially dented except for the region of the coupling holes 7e. This is to reduce the material of the bearing housing 7 as well as the weight of the bearing housing 7. As will be appreciated, the greater the complexity of the outer peripheral surface shape of the bearing housing body 7b, the greater the coupling strength of the bearing housing 7 and the tub 2 when the bearing housing 7 is insert-molded in the tub 2.

In the above described embodiments, the tub base 2a, onto which the stator 6 will be coupled and placed has a hub portion protruding from an outer surface thereof by a predetermined length. The hub portion may be constructed by a certain portion of the tub 2 and the bearing housing hub portion 7c. In this case, the bearing housing hub portion 7c is penetrated through the certain portion of the tub 2. Of course, it will be appreciated that the hub portion may be constructed only by the bearing housing hub portion 7c.

Figure 10:
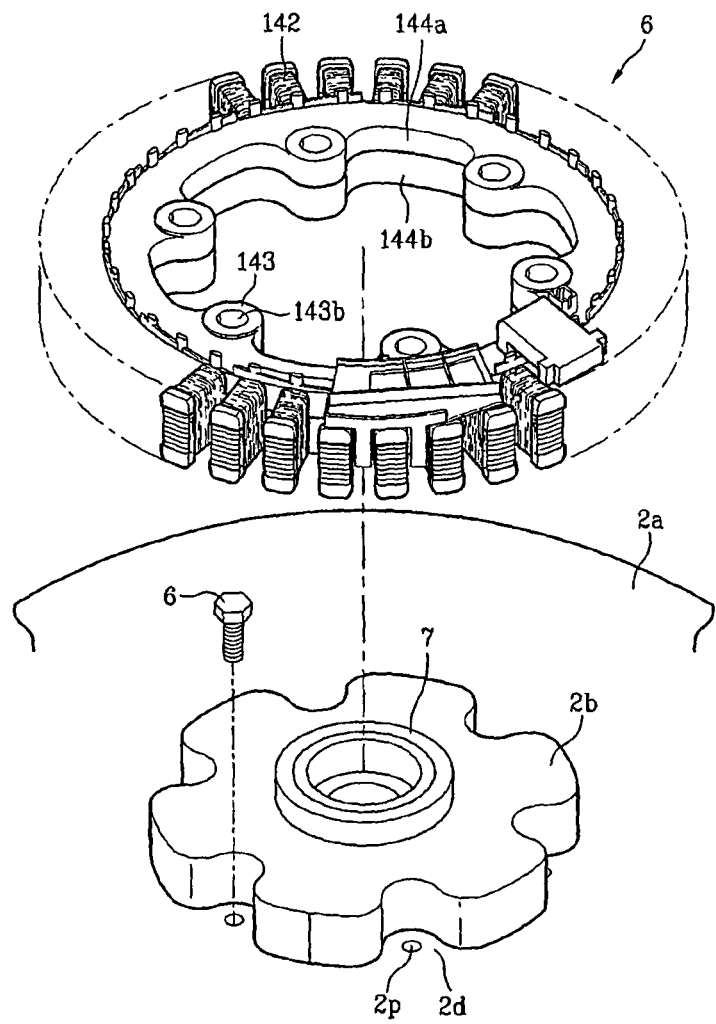
FIG. 10 is a perspective view illustrating a fourth embodiment of the coupling structure of the drive device included in the drum washing machine according to the present invention.

FIG. 10 is a perspective view illustrating a fourth embodiment of the coupling structure of the stator according to the present invention.

In the present embodiment, the tub base 2a to be coupled with the stator 6 has a hub portion 2b protruding from the outer surface of the base 2a by a predetermined length. The hub portion 2b is a portion of the tub 2. The bearing housing 7 is insert-molded through the hub portion 2a, so as to be integrally formed with the tub 2.

As shown in FIG. 10, the outer peripheral surface of the hub portion 2b preferably has a repeated uneven pattern in a circumferential direction thereof. Specifically, the hub portion 2b has concave and convex portions alternately arranged in a circumferential direction thereof. The inner peripheral surface of the stator 6 has a shape corresponding to that of the outer peripheral surface of the hub portion 2b.

With this configuration, the stator 6 is coupled with the tub base 2a as it is inserted into the hub portion 2b. For this, the inner peripheral surface of the stator 6 has the inwardly protruding coupling portions 143. Preferably, a plurality of coupling portions 143 are arranged along the inner peripheral surface of the stator 6. The coupling portions 143 have the coupling bores 143b to couple the stator 6 with the tub 2 by means of bolts b, etc.

Although FIG. 10 illustrates that all the coupling portions 143 have the coupling bores 143b, it is not essential to provide all the coupling portions 143 with the coupling bores 143b. For example, when there are six coupling portions 143, some of the coupling portions 143 may have the coupling bores 143b such that the coupling bores 143b are spaced apart from one another by a predetermined interval. Regardless of the formation of the coupling bores 143b, the coupling portions 143 are inserted into the concave portions defined along the outer peripheral surface of the hub portion 2b, to reinforce the coupling strength of the stator 6 and the tub 2.

The tub base 2b also has a stator seating portion 2d around the hub portion 2b. Although FIG. 10 illustrates no stepped portion between the seating portion 2d and the remaining portion of the tub base 2a, the seating portion 2d preferably has a height smaller than that of the hub portion 2b, but larger than that of the remaining portion by a predetermined value. The protruded seating portion 2d is illustrated in FIG. 7. With the use of the protruded seating portion 24 inner insulators 144a and 144b of the stator, and more particularly, only the coupling portions 143 of the stator 6 come into direct contact with the tub 2, and the outer portion of the stator 6, for example, coils 142 of the stator 6 have no contact with the tub 2.

The seating portion 2d has coupling holes 2p to correspond to the coupling bores 143b of the coupling portions 143 of the stator 6. Preferably, a boss portion 2c is formed around each coupling hole 2p to reinforce the coupling hole 2p. In turn, the boss portion 2c may be reinforced by a plurality of ribs (not shown). Preferably, the boss portion 2c and the ribs constitute a part of the tub 2.

Meanwhile, the matching shape of the hub portion 2b and the stator 6 assures the following functions.

First, the matching shape of the stator 6 and the tub 2 allows the stator 6 to be coupled with the tub 2 while maintaining the concentricity of the stator 6. As a result, the concentricity of the stator 6 can be maintained continuously during operation of the motor as well as during the coupling of the stator 6.

The matching shape of the stator 6 and the tub 2 also increases the coupling strength of the tub 2 and the stator 6. In addition, the hub portion 2b can support the rotation repulsive force of the stator 6 as well as the load of the stator 6.

Accordingly, the load of the stator 6 or external shock is transmitted to the hub portion 2b, rather than being transmitted only to the bolts b. This has the effect of allowing the stator 6 to be more firmly coupled with the tub 2 and also, maintaining the concentricity of the stator 6.

Figure 11:
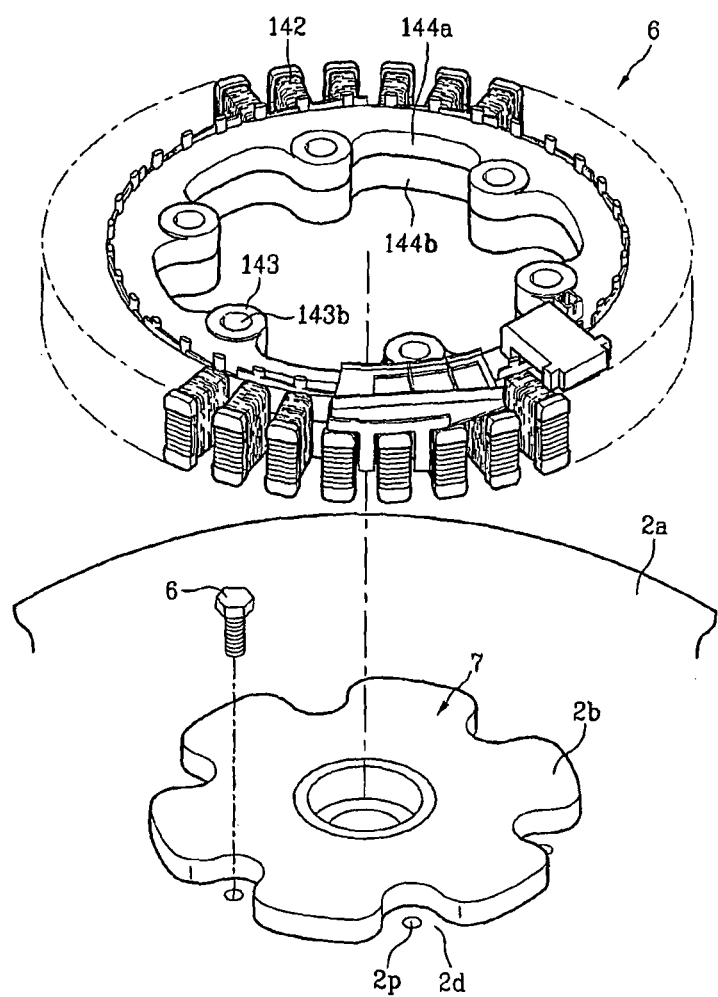
FIG. 11 is a perspective view illustrating a fifth embodiment of the coupling structure of the drive device included in the drum washing machine according to the present invention.

FIG. 11 is a perspective view illustrating a fifth embodiment of the coupling structure of the stator according to the present invention.

In the present embodiment, although the tub base 2a to be coupled with the stator 6 has the hub portion 2b protruding from the outer surface thereof by a predetermined length, the hub portion 2b constitutes a part of the bearing housing 7 rather than a part of the tub 2.

Specifically, although the stator 6 is seated on the tub base 2a, and more particularly, on the seating portion 2d of the tub 2 to thereby be coupled with the tub 2, differently from the above described embodiment, the stator 6 is inserted into the hub portion of the bearing housing 7. Except for the fact that the hub portion 2b constitutes the bearing housing 7 rather than the tub 2, the present embodiment has the same effects as those of the above described embodiment.

Figure 12:
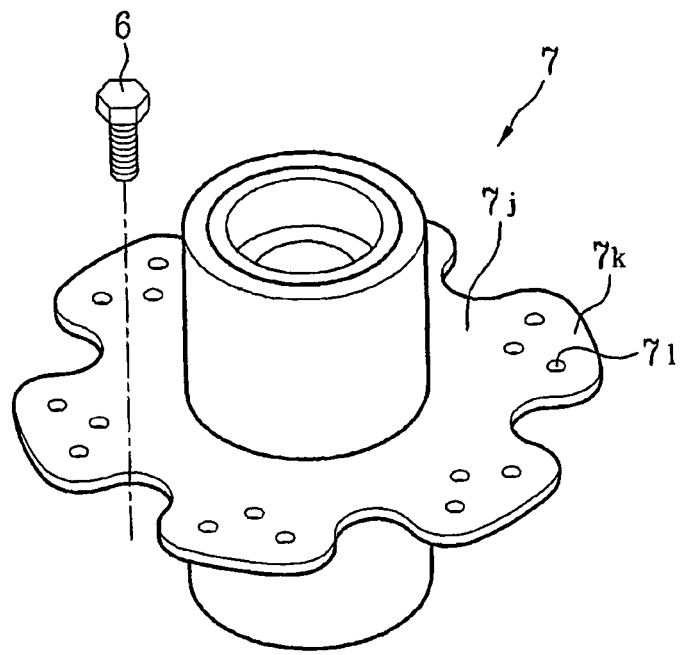
FIG. 12 is a perspective view illustrating an embodiment of a bearing housing according to the present invention.

FIG. 12 is a perspective view illustrating another embodiment of the bearing housing 7 according to the present invention. The bearing housing 7 of the present embodiment is applicable to the above described embodiments shown in FIG. 10 or 11.

The bearing housing 7 has a flange 7j extending radially from the center thereof. The flange 7j is insert-molded in the tub base 2a and coupled with the tub base 2a. With the use of the flange 7j, the bearing housing 7 can be more firmly coupled with the tub 2.

Preferably, the flange 7j has a plurality of holes 7l for the permission of resin, to assure a more firm coupling of the bearing housing 7 and the tub 2.

The flange 7j may further have a plurality of radial extensions 7k. Preferably, the respective neighboring extensions 7k define a bolt penetration space therebetween. Of course, although the flange 7j may be formed with bolt penetration holes (not shown), this makes it difficult to correctly center the respective bolt penetration holes when the bearing housing 7 is insert-molded in the tub 2. For this reason, in the present embodiment, it is preferable to provide a large space to allow the bolt to be penetrated easily within a tolerance range.

The flange 7j of the bearing housing 7 serves not only to increase the coupling strength of the bearing housing 7 and the tub 2, but also to disperse the rotation repulsive force of the stator 6 transmitted through the bolts b. Accordingly, the stator 6 can be more firmly fixed to the tub 2 via the flange 7j of the bearing housing 7.

Figure 13:
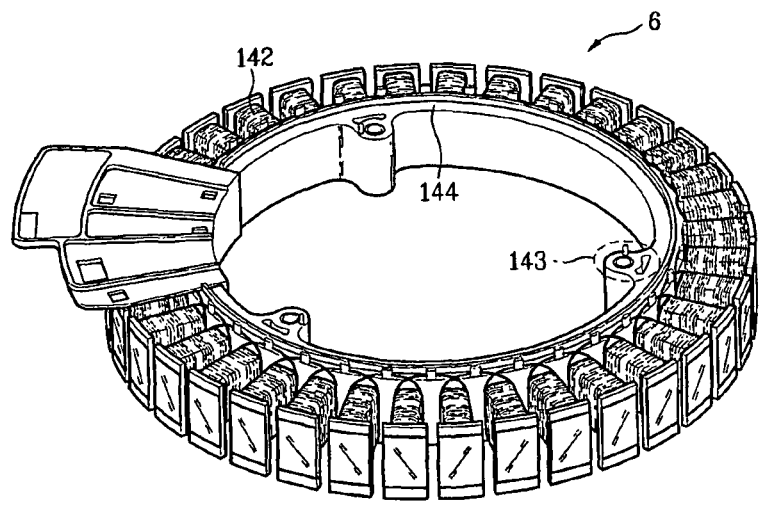
FIG. 13 is a perspective view illustrating a stator shown in FIG. 5.
Figure 14:
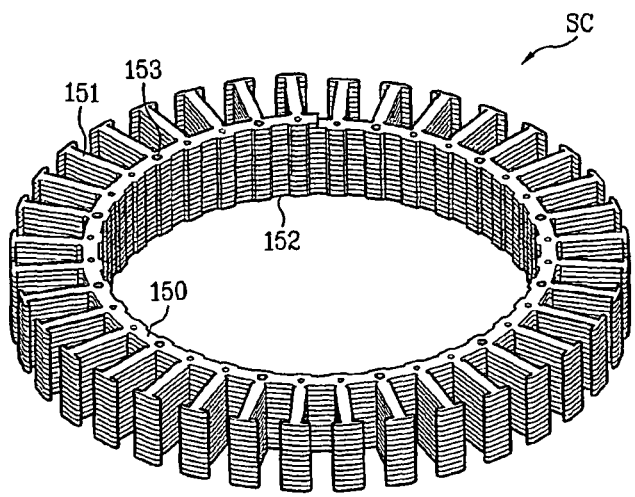
FIG. 14 is a perspective view illustrating a spiral core shown in FIG. 13.

As shown in FIGS. 13 and 14, the stator 6 to constitute the motor together with the rotor 5 includes a spiral core SC, an insulator 144 to surround the spiral core SC, the coils 142 wound on teeth 151 of the spiral core SC, and three or more coupling portions 143 integrally formed with the insulator 144 to protrude inward from the core SC. Generally, a recent large-capacity drum washing machine requires a stator of 1.5 kg or more. However, in the present invention in which the stator 6 employs the spiral core SC and is coupled to the tub base 2a via the insulator 144, the overall weight of the stator can be reduced as compared to that used in the same performance motor.

The spiral core SC has a multilayer structure obtained by spirally winding an iron plate, having a base 150 and teeth 151, from the bottom to the top. The teeth 151 protrude from the base 150 of the spiral core SC in a radial outward direction. The base 150 of the spiral core SC has grooves 152 to reduce stress caused upon winding of the core SC.

Multiple layers of the spiral core SC are coupled with one another by use of rivets 153 penetrated through holes perforated in the base 150.

A winding beginning portion and a winding ending portion of the spiral core SC may be bonded to certain contact positions of the base 150 by welding.

The grooves 152, formed in the base 150 of the spiral core SC, may have a trapezoidal or rectangular shape, or may have an arc shape.

Figure 15:
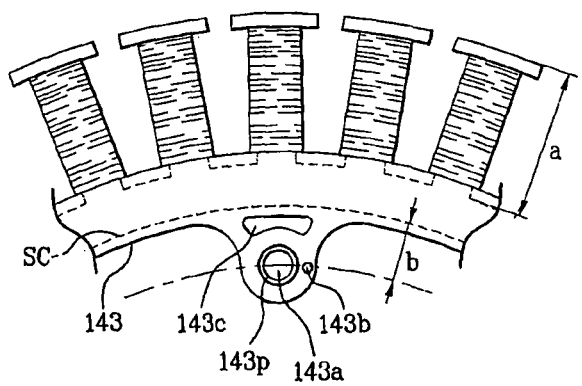
FIG. 15 is a plan view illustrating the important part of the stator shown in FIG. 13.
Figure 16:
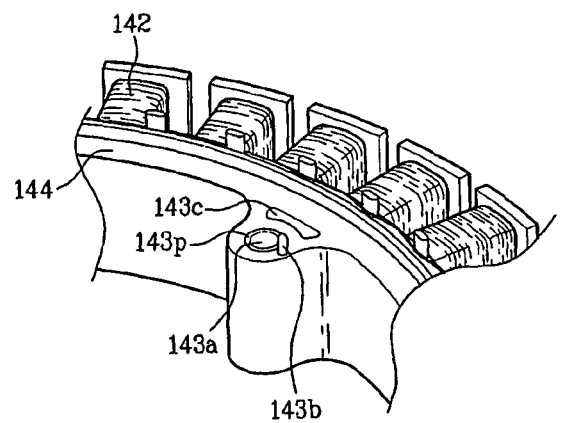
FIG. 16 is a perspective view of the important part of the stator shown in FIG. 13.

Referring to FIGS. 15 and 16, in the stator 6 having the three or more coupling portions 143 protruding in a radial inward direction from an inner peripheral surface of the core SC while being integrally formed with the insulator 144, if a length of each tooth 151 protruding from an outer peripheral surface of the spiral core SC is "a" and a distance from the inner peripheral surface of the spiral core SC to the center of the coupling bore 143b formed in each coupling portion 143 is "b" the coupling portion 143 can be configured to satisfy the condition of a≧b.

In this case, a height of the coupling portion 143 is determined to be more than 20% of the overall height of the stacked core, and more preferably, determined to be equal to the overall height of the stacked core.

The coupling portion 143 has at least one cavity 143c to absorb vibrations caused upon operation of the motor. The coupling portion 143 also has the positioning boss 143a to be engaged with the positioning recess (7f, See FIG. 6) formed in the stator seating portion 7d exposed after the bearing housing 7 is insert-molded in the rear wall of the tub 2.

Preferably, a spring pin 143p or metal tube is inserted into the coupling bore 143b of the coupling portion 143, to reinforce the strength of the coupling bore 143b.

Now, the operation of the drive device for the drum washing machine according to the present invention will be described.

If the rotor 5 begins to be rotated as current is sequentially applied to the coils 142 of the stator 6 under the control of a motor driving controller (not shown) attached to a panel, the shaft 4, which is serration-coupled with the connector 16 coupled to the rotor 5, is rotated. Thereby, a drive force of the rotor 5 is transmitted to the drum 3 through the shaft 4, causing the drum 3 to be rotated.

Meanwhile, the operation of the drum washing machine having the above described drive device is as follows.

First, since the tub 2 of the drum washing machine according to the present invention is made of high heat-resistance plastic, the tub 2 has a low weight and can be easily injection molded to assure high productivity.

In addition, since the bearing housing 7, as bearing supporting means, of the drum washing machine according to the present invention is made of metal such as aluminum alloy, etc., the bearing housing 7 has no thermal deformation even at a high temperature, and is applicable even to a drum washing machine having a drying cycle.

In the present invention, the metallic bearing housing 7 is insert-molded into the hub portion 2b formed at the rear wall of the tub 2 during the injection molding of the plastic tub 2, to thereby be integrally formed with the tub 2. Therefore, the present invention eliminates a process for assembling the bearing housing 7 to the rear wall of the tub 2, thereby achieving a simplified assembling operation and reduced number of assembling processes.

The stator 6 constituting the motor together with the rotor 5, as shown in FIG. 14, has the grooves 152 formed in the base 150 of the spiral core SC to reduce stress caused upon winding of the core. Accordingly, the winding of the core can be easily accomplished with a reduced effort.

In particular, as shown in FIG. 15, in the case of the stator 6 having the three or more coupling portions 143 protruding in a radial inward direction from the inner peripheral surface of the core SC while being integrated with the insulator, if a length of each tooth 151 protruding from the outer peripheral surface of the spiral core SC is "a" and a distance from the inner peripheral surface of the spiral core SC to the center of the coupling bore 143b formed in each coupling portion 143 is "b" the coupling portion 143 is configured to satisfy the condition of a≧b.

Although it is advantages, in the view of a low torque, that the coupling bore 143b is located close to a load acting position, when the coupling bore 143a is positioned excessively close to the load acting position, it inevitably requires to reduce the diameter of bolts, and consequently, to provide an excessively great number of bolts for supporting the overall stator 6. The condition of a≧b is determined in consideration of the above description.

Referring to FIG. 16, the height of the coupling portion 143 is determined to be more than 20% of the overall height of the stacked core. If the height of the coupling portion 143 is less than 20% of the overall height of the stacked core, the coupling portion 143 has a high risk of damage by vibrations caused upon operation of the motor.

In particular, although the height of the coupling portion 143 is preferably equal to the overall height of the stacked core, the coupling portion 143 may have a height larger than the overall height of the stacked core.

However, if the height of the coupling portion 143 increases excessively, it increases the overall width of the drive device of the washing machine, causing a reduction in the washing capacity of the washing machine. In consideration of this fact, it is preferable that the height of the coupling portion 143 be less than two times of the overall height of the stacked core.

The cavity 143c formed in the top of the coupling portion 143 absorbs or alleviates vibrations caused upon operation of the motor, thereby improving the mechanical reliability of the stator 6.

The positioning boss 143a formed on the coupling portion 143 is engaged with the positioning recess 7f of the tub 2, thereby allowing the stator 6 to be easily coupled with the bearing housing 7.

In particular, the present invention can eliminate a tub supporter that has been conventionally used to support the stator 6 while protecting the rear wall of the tub 2.

Meanwhile, the front end of the shaft 4 is coupled with the spider 10 provided at the rear wall of the drum 3, and the brass bushing 11 is forcibly press-fitted around a region of the shaft 4 from just behind the spider 10 to the front bearing 600a, thereby preventing the generation of rust on the shaft 4.

Also, the sealing member 12 is installed on the outer surface of the bushing 11, thereby preventing invasion of moisture into the bearing.

The rotor 5 of the direct-connection type motor is coupled to the center of the rear end of the shaft 4, and the stator 6 is located inside the rotor 5. The lateral wall 13b of the rotor 5, extending forward from the edge of the rear wall 13a of the rotor 5, is circumferentially formed with the stepped portion having the seating surface 130 to support the magnet M. Accordingly, when the magnet M is attached to the inner surface of the rotor 5, the magnet M is supported by the seating surface 130, and this has the effect of facilitating the fabrication of the rotor 5.

The rear wall 13a of the rotor 5 is centrally formed with the hub 132 having the through-holes 131 to allow the penetration of the fastening members 15b such as bolts, etc. for coupling the rotor 5 with the shaft 4. The plurality of cooling fins 133 are radially arranged around the hub 132 of the rotor 5 to have a predetermined radial length. During rotation of the rotor 5, the cooling fins 133 blow air toward the stator 6, thereby removing heat generated from the stator 6.

In this case, the cooling fins 133 are formed by a lancing process to face the opening of the rotor 5, and with the lancing process, the cooling fins 133 define the vent hole 134.

Here, since the rotor 5 is fabricated by pressing an iron plate, the fabrication time of the rotor 5 can be reduced significantly, and the rotor 5 can achieve a high productivity.

Further, with the embossing portions 135 formed between the respective neighboring cooling fins 133 at the rear wall 13a of the rotor 5, the overall strength of the rotor 5 can be improved and the drain holes 136 of the respective embossing portions 135 enable the discharge of moisture.

The connector 16 is fabricated by injection molding resin, and has a different vibration mode from that of the rotor 5 made of an iron plate. That is, the connector 16 attenuates vibrations to be transmitted from the rotor 5 to the shaft 4.

As the serrations 164 provided on the inner peripheral surface of the connector 16 are engaged with the serrations 400 provided around the rear end of the shaft 4, a rotating force of the rotor 5 can be transmitted to the shaft 4 via the connector 16.

It will be apparent to those skilled in the art that various modifications and variations of dimensions, shapes, and materials of constituent elements of the present invention can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, a drum washing machine having a direct-connection type motor according to the present invention has the following effects.

Firstly, the direct-connection type motor can achieve a reduction in the generation of noises and failures as well as in the loss of power. Also, the use of a metallic bearing housing having no thermal deformation makes it possible to apply the motor to products having a drying function.

Secondly, as a result of employing a spiral core SC having an easy winding structure, the drum washing machine of the present invention can prevent waste of materials and facilitate the fabrication of a stator. Further, the fabricated stator can be reduced in weight while maintaining the same performance. As a result, the present invention can eliminate a tub supporter that has been conventionally used to reinforce the strength of the rear wall of a tub, thereby allowing the stator to be easily coupled with the tub.

Thirdly, the present invention improves the configuration of the drive device so as to directly transmit a drive force of the motor to a drum. This reduces the generation of noises and failures as well as the loss of power, thereby achieving an improved, washing ability and reliability of products. Also, the fabrication efficiency of constituent elements of the drive device is improved, resulting in an improved productivity of the washing machine.

Fourthly, according to the present invention, the concentricity of the stator can be easily set in the course of coupling the stator, and can be maintained continuously.

The invention claimed is:

1. A drum washing machine comprising:
a tub installed in a housing to receive wash water therein, the tub including a hub portion that protrudes from a center of a rear outer surface of the tub, and a stator seating portion in a radial outward position of the hub portion, and the hub portion and the stator seating portion being integrally formed with the tub;
a drum rotatably installed in the tub;
a rotor having a rotating shaft connected to the drum;
a bearing housing having at least one bearing for supporting the rotating shaft of the rotor, and the bearing housing including a radially protruding flange, the bearing housing being located at the tub, and the bearing housing being insert-molded through the hub portion of the tub so the bearing housing is integrally formed with the tub; and
a stator spaced apart from the rotor by a predetermined distance, the stator being directly connected to the stator seating portion of the tub, and the stator being separated from the radially protruding flange.

2. The drum washing machine according to claim 1, wherein the bearing housing is located to penetrate through the hub portion of the tub.

3. The drum washing machine according to claim 2, wherein an outer peripheral surface of the bearing housing and an inner peripheral surface of the hub portion are formed, along their circumferential or longitudinal direction, with indentations to engage with each other.

4. The drum washing machine according to claim 1, wherein the stator comprises a plurality of coupling portions protruding in a radial inward direction thereof, the coupling portions being seated on the stator seating portion of the tub.

5. The drum washing machine according to claim 4, wherein an outer peripheral surface of the hub portion of the tub has a shape corresponding to a shape of an inner peripheral surface of the stator.

6. The drum washing machine according to claim 4, wherein at least two of the coupling portions have coupling bores, and the stator seating portions have coupling holes corresponding to the coupling bores.

7. The drum washing machine according to claim 6, wherein the hub portion includes an inserting portion to be inserted between the coupling portions of the stator.

8. The drum washing machine according to claim 1, wherein the flange comprises:
a plurality of extensions radially extending from the bearing housing; and
at least one hole formed in at least one of the extensions.

9. The drum washing machine according to claim 8, wherein the coupling portions of the stator are disposed between the respective neighboring extensions and are coupled with the tub.

10. The drum washing machine according to claim 1, wherein the hub portion includes a dented region that extends in a radial inward direction of the hub portion.

11. The drum washing machine according to claim 1, wherein the bearing housing includes a body having a cylindrical shape that extends in a first direction, and the hub portion provided at a side of the body and extending in a second direction away from a center of the hub portion, the second direction being perpendicular to the first direction, the stator seating portion to extend in a radial outward position from the hub portion and a dented region to extend in a radial inward direction of the hub portion.

* * * * *